(12) United States Patent
Baur (10) Patent No.: US 10,850,667 B2
(45) Date of Patent: Dec. 1, 2020

(54) INTERIOR REARVIEW MIRROR ASSEMBLY

(71) Applicant: MAGNA MIRRORS OF AMERICA, INC., Holland, MI (US)

(72) Inventor: Michael J. Baur, Kentwood, MI (US)

(73) Assignee: MAGNA MIRRORS OF AMERICA, Holland, MI (US)

( * ) Notice: Subject to any disclaimer, the term of this patent is extended or adjusted under 35 U.S.C. 154(b) by 247 days.

(21) Appl. No.: 15/968,807

(22) Filed: May 2, 2018

(65) Prior Publication Data

US 2018/0319339 A1    Nov. 8, 2018

Related U.S. Application Data

(60) Provisional application No. 62/501,264, filed on May 4, 2017.

(51) Int. Cl.
| | |
|---|---|
| *B60R 1/04* | (2006.01) |
| *G02F 1/155* | (2006.01) |
| *B60R 1/08* | (2006.01) |
| *G02F 1/153* | (2006.01) |

(52) U.S. Cl.
CPC .............. *B60R 1/04* (2013.01); *B60R 1/088* (2013.01); *G02F 1/153* (2013.01); *G02F 1/155* (2013.01); *G02F 2203/02* (2013.01)

(58) Field of Classification Search
CPC .... B60R 1/02; B60R 1/04; B60R 1/08; B60R 1/083; B60R 1/088; B60R 1/089; G02F 1/153; G02F 1/1533; G02F 1/155; G02F 1/161; G02F 2001/1536; G02F 2001/1552; G02F 2001/1555

USPC ....... 359/265, 267, 268, 269, 270, 271, 272, 359/273, 274
See application file for complete search history.

(56) References Cited

U.S. PATENT DOCUMENTS

| | | |
|---|---|---|
| 3,427,096 A | 2/1969 | Dykema et al. |
| 4,712,879 A | 12/1987 | Lynam et al. |
| 5,066,112 A | 11/1991 | Lynam et al. |
| 5,073,012 A | 12/1991 | Lynam |
| 5,076,673 A | 12/1991 | Lynam et al. |
| 5,115,346 A | 5/1992 | Lynam |
| 5,140,455 A | 8/1992 | Varaprasad et al. |
| 5,142,407 A | 8/1992 | Varaprasad et al. |
| 5,151,816 A | 9/1992 | Varaprasad et al. |
| 5,253,109 A | 10/1993 | O'Farrell et al. |

(Continued)

*Primary Examiner* — Nicholas R. Pasko
(74) *Attorney, Agent, or Firm* — Honigman LLP (57) ABSTRACT

An interior rearview mirror assembly for a vehicle includes a mirror casing and an electro-optic reflective element assembly disposed at the mirror casing. The front substrate of the reflective element has a first surface and a second surface and a perimeter edge between the first and second surfaces. The second surface of the front substrate has a transparent conductive coating established thereat. The rear substrate of the reflective element has a third surface and a fourth surface and a perimeter edge between the third and fourth surfaces. The third surface of the rear substrate has a conductive coating established thereat. With the electro-optic reflective element assembly disposed at the mirror casing, the perimeter edges of both the front and rear substrates are exterior the mirror casing and provide a curved transition between the first surface of the front substrate and an outer surface of the mirror casing.

19 Claims, 4 Drawing Sheets

(56) References Cited

U.S. PATENT DOCUMENTS

| | | | |
|---|---|---|---|
| 5,406,414 A | 4/1995 | O'Farrell et al. | |
| 5,525,264 A | 6/1996 | Cronin et al. | |
| 5,567,360 A | 10/1996 | Varaprasad et al. | |
| 5,594,222 A | 1/1997 | Caldwell | |
| 5,610,756 A | 3/1997 | Lynam et al. | |
| 5,668,663 A | 9/1997 | Varaprasad et al. | |
| 5,724,187 A | 3/1998 | Varaprasad et al. | |
| 5,798,688 A | 8/1998 | Schofield | |
| 5,910,854 A | 6/1999 | Varaprasad et al. | |
| 5,984,482 A | 11/1999 | Rumsey et al. | |
| 6,001,486 A | 12/1999 | Varaprasad et al. | |
| 6,002,511 A | 12/1999 | Varaprasad et al. | |
| 6,154,306 A | 11/2000 | Varaprasad et al. | |
| 6,178,034 B1 | 1/2001 | Allemand et al. | |
| 6,310,611 B1 | 10/2001 | Caldwell | |
| 6,320,282 B1 | 11/2001 | Caldwell | |
| 6,369,804 B1 | 4/2002 | Sandbach | |
| 6,437,258 B1 | 8/2002 | Sandbach | |
| 6,452,479 B1 | 9/2002 | Sandbach | |
| 6,492,980 B2 | 12/2002 | Sandbach | |
| 6,501,465 B2 | 12/2002 | Sandbach | |
| 6,504,531 B1 | 1/2003 | Sandbach | |
| 6,627,918 B2 | 9/2003 | Getz et al. | |
| 6,690,268 B2 | 2/2004 | Schofield et al. | |
| 7,184,190 B2 * | 2/2007 | McCabe | B60R 1/12 359/238 |
| 7,195,381 B2 | 3/2007 | Lynam et al. | |
| 7,224,324 B2 | 5/2007 | Quist et al. | |
| 7,249,860 B2 | 7/2007 | Kulas et al. | |
| 7,253,723 B2 | 8/2007 | Lindahl et al. | |
| 7,255,451 B2 | 8/2007 | McCabe et al. | |
| 7,274,501 B2 | 9/2007 | McCabe et al. | |
| 7,360,932 B2 | 4/2008 | Uken et al. | |
| 7,446,924 B2 | 11/2008 | Schofield et al. | |
| 7,626,749 B2 | 12/2009 | Baur et al. | |
| 8,508,831 B2 | 8/2013 | De Wind et al. | |
| 8,730,553 B2 | 5/2014 | De Wind et al. | |
| 9,346,403 B2 | 5/2016 | Uken et al. | |
| 9,598,016 B2 | 3/2017 | Blank et al. | |
| 2006/0050018 A1 | 3/2006 | Hutzel et al. | |
| 2006/0061008 A1 | 3/2006 | Karner et al. | |
| 2009/0251785 A1* | 10/2009 | Bruhnke | B60R 1/04 359/604 |
| 2010/0085653 A1 | 4/2010 | Uken et al. | |
| 2012/0038964 A1* | 2/2012 | De Wind | B24B 9/02 359/265 |
| 2012/0236388 A1* | 9/2012 | De Wind | G02B 5/04 359/267 |
| 2013/0107563 A1 | 5/2013 | McCabe et al. | |
| 2013/0170013 A1* | 7/2013 | Tonar | G02F 1/157 359/296 |
| 2014/0022390 A1 | 1/2014 | Blank et al. | |
| 2014/0055836 A1* | 2/2014 | Cammenga | G02F 1/161 359/267 |
| 2014/0313563 A1* | 10/2014 | Uken | B60R 1/088 359/267 |
| 2015/0097955 A1 | 4/2015 | De Wind et al. | |
| 2015/0321611 A1* | 11/2015 | Lock | B60R 1/04 359/267 |
| 2015/0334354 A1* | 11/2015 | Uken | B60R 1/088 348/148 |
| 2019/0146297 A1 | 5/2019 | Lynam et al. | |

\* cited by examiner

FIG. 10

INTERIOR REARVIEW MIRROR ASSEMBLY

CROSS REFERENCE TO RELATED APPLICATION

The present application claims the filing benefit of U.S. provisional application Ser. No. 62/501,264, filed May 4, 2017, which is hereby incorporated herein by reference in its entirety.

FIELD OF THE INVENTION

The present invention relates generally to the field of interior rearview mirror assemblies for vehicles.

BACKGROUND OF THE INVENTION

It is known to provide a variable reflectance mirror reflective element for an interior or exterior rearview mirror assembly of a vehicle. It is also known to provide a rounded or curved exposed perimeter edge of a front substrate of the mirror reflective element, with the rear substrate nested in the mirror casing at which the mirror reflective element is mounted.

SUMMARY OF THE INVENTION

The present invention provides an interior rearview mirror assembly that has a variable reflectance electro-optic mirror reflective element with an exposed rounded perimeter or circumferential edge, with the rounded or curved perimeter regions spanning the perimeter of the front substrate and at least a portion of the perimeter edge of the rear substrate. The rounded or curved perimeter regions of the front and rear substrates cooperate or combine to provide a curved transition between an outer surface of the mirror casing and a front surface of the front substrate. The mirror assembly includes enhanced or improved electrical connectors established at the rear of the reflective element and in electrical connection with the conductive coating or coatings at the rear of the front substrate and at the front and/or rear of the rear substrate. The mirror reflective element may be disposed at a mirror casing that may house one or more electronic accessories.

These and other objects, advantages, purposes and features of the present invention will become apparent upon review of the following specification in conjunction with the drawings.

DESCRIPTION OF THE PREFERRED EMBODIMENTS

Figure 1:
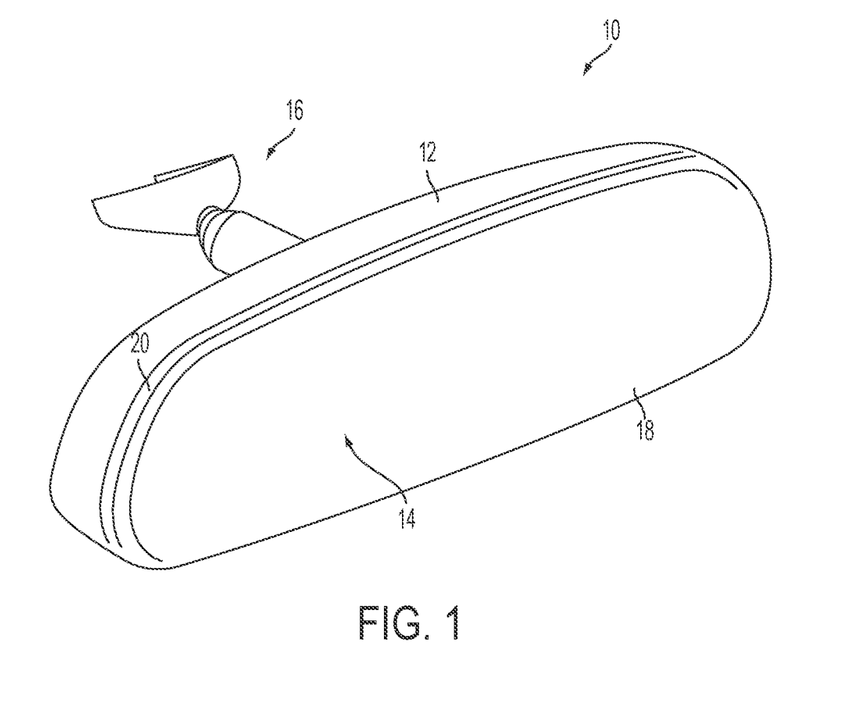
FIG. 1 is a perspective view of an interior rearview mirror assembly in accordance with the present invention.

Referring now to the drawings and the illustrative embodiments depicted therein, an interior rearview mirror assembly 10 for a vehicle includes a casing 12 and a reflective element 14 positioned at a front portion of the casing 12 (FIG. 1). In the illustrated embodiment, mirror assembly 10 is configured to be adjustably mounted to an interior portion of a vehicle (such as to an interior or in-cabin surface of a vehicle windshield or a headliner of a vehicle or the like) via a mounting structure or mounting configuration or assembly 16. The mirror reflective element comprises a variable reflectance mirror reflective element that varies its reflectance responsive to electrical current applied to conductive coatings or layers of the reflective element. The electrical current is applied via electrical connectors disposed at the rear of the mirror reflective element, as discussed below.

The mirror reflective element 14 (FIG. 3) comprises a laminate construction variable reflectance electro-optic (such as electrochromic) reflective element assembly having a front substrate 18 and a rear substrate 20 with an electro-optic medium 22 (such as electrochromic medium) sandwiched therebetween and bounded by a perimeter seal 24. The front substrate 18 has a front or first surface (the surface that generally faces the driver of a vehicle when the mirror assembly is normally mounted at the vehicle) and a rear or second surface opposite the front surface, and the rear substrate 20 has a front or third surface and a rear or fourth surface opposite the front surface, with the electro-optic medium disposed between the second surface and the third surface and bounded by the perimeter seal of the reflective element (such as is known in the electrochromic mirror art). The second surface has a transparent conductive coating established thereat (such as an indium tin oxide (ITO) layer, or a doped tin oxide layer or any other transparent electrically semi-conductive layer or coating or the like (such as indium cerium oxide (ICO), indium tungsten oxide (IWO), or indium oxide (IO) layers or the like or a zinc oxide layer or coating, or a zinc oxide coating or the like doped with aluminum or other metallic materials, such as silver or gold or the like, or other oxides doped with a suitable metallic material or the like, or such as disclosed in U.S. Pat. No. 7,274,501, which is hereby incorporated herein by reference in its entirety), while the third surface has a metallic reflector coating (or multiple layers or coatings) established thereat. The front or third surface of the rear substrate 20 may include one or more transparent semi-conductive layers (such as an ITO layer or the like), and one or more metallic electrically conductive layers (such as a layer of silver, aluminum, chromium or the like or an alloy thereof), and may include multiple layers such as disclosed in U.S. Pat. Nos. 7,274,501; 7,184,190 and/or 7,255,451, which are hereby incorporated herein by reference in their entireties. The mirror reflector may comprise any suitable coatings or layers, such as a transflective coating or layer, such as described in U.S. Pat. Nos. 7,626,749; 7,274,501; 7,255,451; 7,195,381; 7,184,190; 6,690,268; 5,140,455; 5,151,816; 6,178,034; 6,154,306; 6,002,511; 5,567,360; 5,525,264; 5,610,756; 5,406,414; 5,253,109; 5,076,673; 5,073,012; 5,115,346; 5,724,187; 5,668,663; 5,910,854; 5,142,407 and/or 4,712,879, which are hereby incorporated herein by reference in their entireties, disposed at the front surface of the rear substrate (commonly referred to as the third surface of the reflective element) and opposing the electro-optic medium, such as an electrochromic medium disposed between the front and rear substrates and bounded by the perimeter seal (but optionally, the mirror reflector could be disposed at the rear surface of the rear substrate (commonly referred to as the fourth surface of the reflective element), while remaining within the spirit and scope of the present invention).

The front substrate of the mirror assembly has curved or rounded perimeter edges, such as described in U.S. Pat. Nos. 9,598,016; 9,346,403; 8,730,553 and/or 8,508,831, and/or U.S. Publication Nos. US-2014-0313563 and/or US-2015-0097955, which are hereby incorporated herein by reference in their entireties (and with electrochromic and prismatic mirrors of such construction are commercially available from the assignee of this application under the trade name INFINITY™ mirror).

Figure 2:
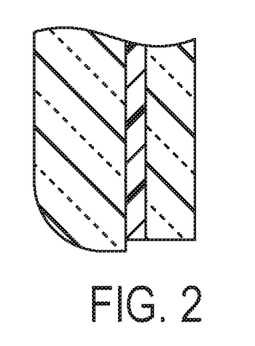
FIG. 2 is an enlarged sectional view of a typical frameless mirror cell, with an oversized front substrate providing the rounded perimeter edge.

The present invention provides such a curved or rounded appearance by rounding both the front and rear substrates, such as by grinding and polishing the assembled mirror cell (the front and rear substrates with the electro-optic medium sandwiched therebetween and bounded by a perimeter seal). As shown in FIG. 2, a typical frameless design may have the front substrate (having a thickness of 2-3.2 mm) rounded about its periphery (and having a radius of curvature of at least about 2.5 mm), and then attached at the rear substrate (having a thickness of around 1.1 to 2.3 mm or thereabouts). The radius of curvature of the rounded exposed edge is provided solely by the front glass substrate. The rear substrate is then nested into the mirror casing while the front substrate is exposed and the curved or rounded edge regions provide a smooth continuous transition from the planar front surface of the front substrate to the side wall of the mirror casing. In order to meet the regulatory and other requirements, glass thicknesses have been increased to allow for suitable geometry on the finished frameless mirror.

Figure 3:
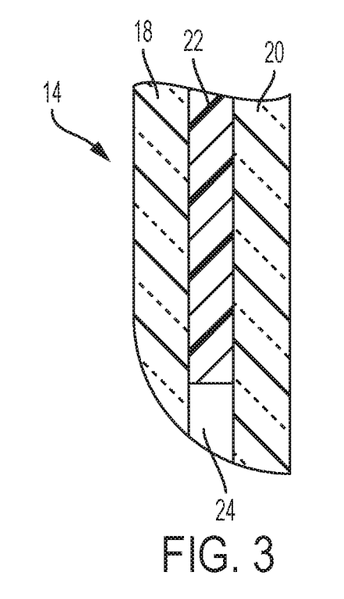
FIG. 3 is an enlarged sectional view of the mirror cell of the present invention, showing the rounded perimeter edge spanning the front substrate and the rear substrate.

As can be seen with reference to FIG. 3, the mirror reflective element 14 of the present invention has the EC mirror cell (comprising the front substrate and the rear substrate laminated together with the electrochromic medium disposed therebetween and bounded by a perimeter seal) assembled and then ground and polished to provide the desired curved or rounded perimeter edge over the perimeter regions of the front substrate and the rear substrate. In such an embodiment, the front and rear glass substrates may comprise thinner substrates, such as around 1.6 mm each (which is thinner than the front substrate of known mirror constructions). By grinding two thin glass substrates after assembly as a cell, the required edge can be provided over the combination of the two substrates.

The curved perimeter edges of the front and rear substrates cooperate or combine to provide the curved transition between the outer surface of the mirror casing and the front or first surface of the front glass substrate. The curved perimeter edges of the front and rear substrates may have the same radius of curvature to provide a smooth continuous-curvature rounded transition between the outer surface of the mirror casing and the front or first surface of the front glass substrate, or the curved perimeter edges of the front and rear glass substrates may have different radii of curvature (for example, the curved surface of the perimeter edge of the rear glass substrate may have a larger radius of curvature as compared to the curved surface of the perimeter edge of the front glass substrate).

The perimeter seal is small enough at the exposed perimeter so to not be highly visible. Optionally, the perimeter regions of the front and/or rear substrates may include an opaque perimeter band or coating to conceal the seal about the periphery of the mirror cell. Optionally, the seal may comprise a hardened material at least at its outer region that can be ground and polished with the glass substrates to form the smooth curved or rounded transition surface between the planar front surface of the front substrate and the rear edge region of the rear substrate or the exterior surface of the mirror casing.

In order to power or electrify the electrically conductive second and third surface coatings (so as to vary the transmission through the electro-optic medium), the electrical connections must be made from the rear of the reflective element and any intrusion onto the now exposed perimeter edge of the rear substrate should be avoided or minimized.

Figure 4:
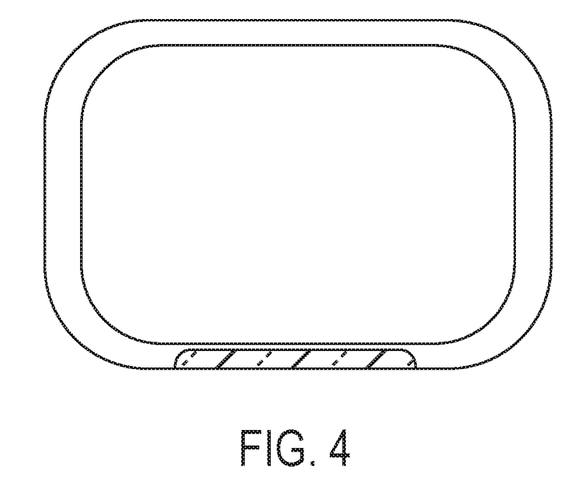
FIG. 4 is a plan view of a mirror cell of the present invention.
Figure 5:
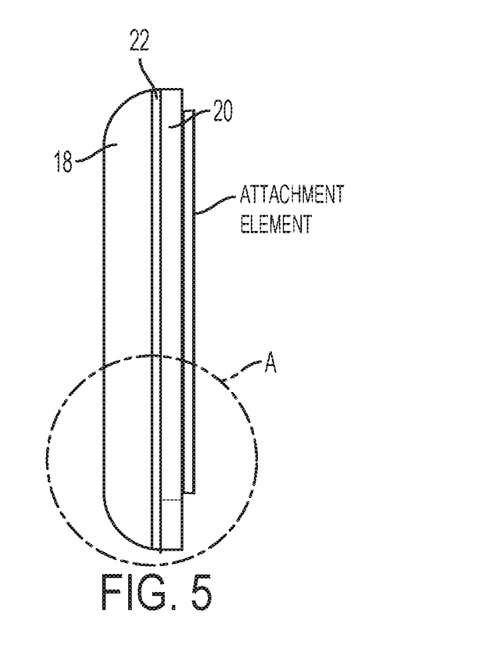
FIG. 5 is a side elevation of the mirror cell of FIG. 4, shown attached at the attachment element of the mirror assembly.
Figure 6:
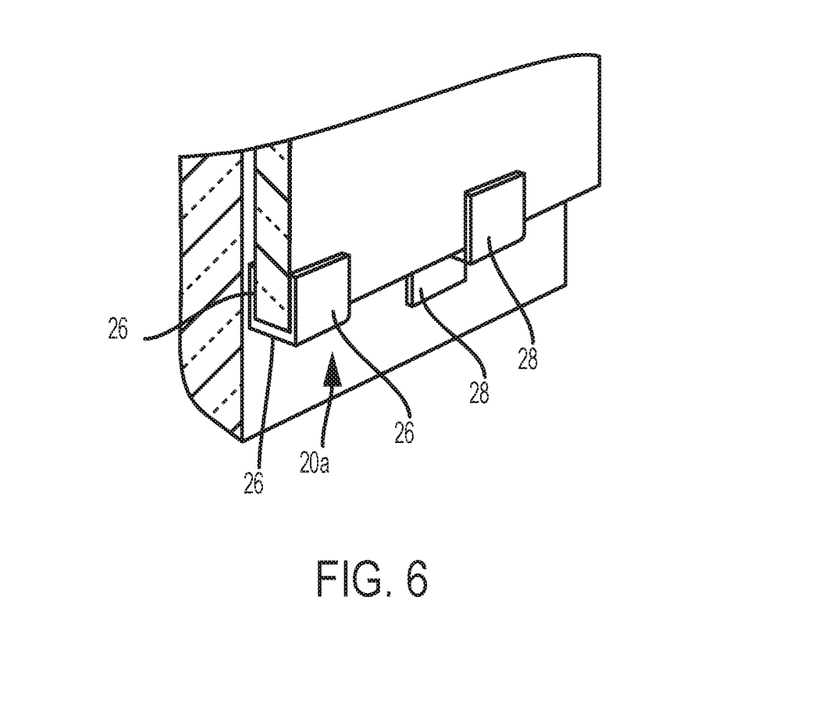
FIG. 6 is an enlarged perspective view of a rear region of the mirror cell, showing a notch at the rear substrate that allows for electrical connections to be made to the conductive coatings of the second and third surfaces of the mirror cell.
Figure 7:
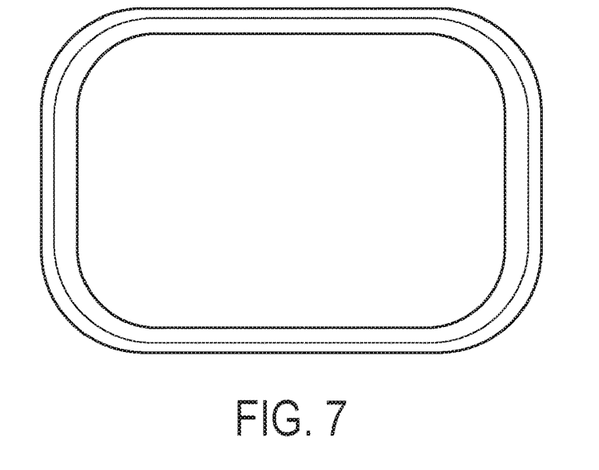
FIG. 7 is a plan view of another mirror cell of the present invention.
Figure 8:
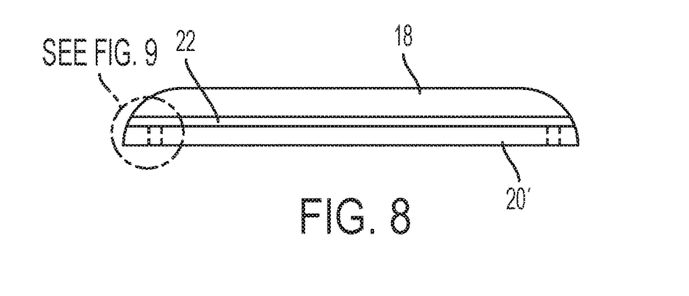
FIG. 8 is a side elevation of the mirror cell of FIG. 7.

Optionally, and such as shown in FIGS. 4-6, provides a small cut away on the rear substrate, which can then be concealed with a mating piece of the mirror housing when the mirror reflective element is attached at the mirror housing or casing. The reflective element thus provides a fully treated rounded or curved exposed perimeter surface (provided by both the front and rear substrates), with a notch along a portion of the rear substrate that may receive a portion of the mirror casing or complimentary casing or housing insert therein to fill the small notch (optionally, the notch may be very small and may not have a portion of the mirror casing disposed thereat). For example, and as best shown with reference to FIGS. 4 and 6, a small notch or groove 20a may be provided at a perimeter region of the rear substrate, and an electrically conductive wraparound coating or trace 26 may be disposed thereat to electrically connect a connecting pad at the rear (fourth) surface of the reflective element to the third surface electrically conductive mirror reflector (where the trace 26 may be disposed at the rear or fourth surface and along the notch 20a to the third surface). Similarly, another electrically conductive wraparound coating or trace 28 may be disposed at the notch to electrically connect another connecting pad at the rear (fourth) surface of the reflective element to the second surface electrically conductive transparent coating of the front substrate (where the trace 28 may be disposed at the rear or fourth surface and along the notch 20a and over or along the perimeter seal to the second surface of the front substrate).

The two coatings or traces 28, 26 are electrically isolated from one another and provide electrical connections to the respective electrically conductive coatings at the second and third surfaces of the reflective element or cell so as to allow electrification of the electro-optic medium when the coatings or traces are powered. The second surface electrification coating 28 may be disposed at an area of the notch where the wrapped third surface electrification coating 26 is not disposed or may be electrically isolated from the wrapped coating 26, such as via non-electrically conductive material disposed between the coatings or via isolation lines ablated or otherwise established through the electrically conductive coating(s) or the like. When the mirror reflective element is attached at a mirror housing or casing, a portion of the mirror casing may be received in the notch or groove to conceal and encase the traces.

Figure 9:
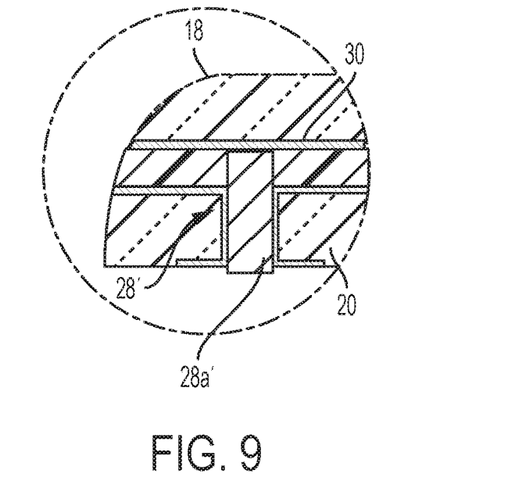
FIG. 9 is an enlarged sectional view of the mirror cell, showing a via or passageway established through the rear substrate to facilitate electrical connection to the electrically conductive coating at the rear surface of the front substrate.

Optionally, and as shown in FIGS. 7-10, the rear substrate 20' may have holes or vias or passageways 26', 28' established therethrough to allow for electrical connection from contacts at the rear surface of the rear substrate to the respective electrically conductive coatings at the second and third surfaces of the cell. For example, and such as shown in FIG. 9, a hole or via or passageway 28' may be established through the rear substrate and through the electro-optic medium, and an electrically conductive material 28a' (such as an electrically conductive epoxy or paste or other suitable material) may be disposed therein to connect the contact at the fourth surface to the second surface coating (such as to an electrically conductive perimeter band 30 at the rear or second surface of the front substrate 18). The electrically conductive material is electrically isolated from the third surface coating (such as by ablating the third surface coating from around the hole or via or passageway or via fixturing) and is electrically isolated from the electro-optic medium (such as via a non-electrically conductive sleeve or seal material disposed between the electrically conductive material and the electro-optic medium).

Figure 10:
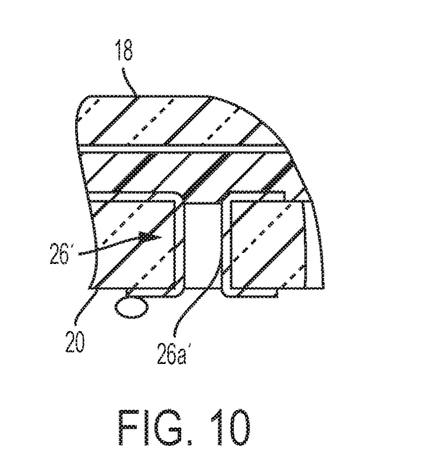
FIG. 10 is an enlarged sectional view of the mirror cell, showing a via or passageway established through the rear substrate to facilitate electrical connection to the electrically conductive coating at the front surface of the rear substrate.

Similarly, and such as shown in FIG. 10, an electrically conductive material or coating 26a' may be disposed at and in the other via or hole or passageway 26' and may wrap around the third and fourth surfaces to establish electrically conductive continuity between the fourth surface and the third surface coatings.

Therefore, the present invention provides for an electro-optic mirror reflective element that has a rounded or curved exposed perimeter edge that spans both the front substrate and the rear substrate. Thus, the present invention can provide the desired rounded exposed edge of the mirror, while making the mirror substrates (particular the front substrate) out of a thinner glass material. The electrical connections to the electrically conductive coatings at the opposing surfaces of the front and rear substrates are made in a way that avoids any connections or elements at the periphery of the mirror cell, since substantially the entirety of the periphery of the cell is exposed when the reflective element is mounted at a mirror casing and mounted in a vehicle.

During assembly of the mirror reflective element at the casing, the rear substrate of the reflective element may attach at an attachment element of the mirror casing. For example, the fourth surface of the rear substrate may be adhesively attached at at least a portion of the attachment element of the mirror casing. Optionally, the attachment element may comprise an attachment plate that is configured to snap attach at internal structure of the mirror casing to attach the electro-optic reflective element assembly at the mirror casing. When the electro-optic reflective element assembly is attached at the mirror casing, both the front substrate and the rear substrate are exposed and rounded (such as via grinding and polishing of the glass edges) to provide a smooth continuous curved surface (having a radius of curvature of at least 2.5 mm, such as about 2.8 mm or thereabouts) from the planar front or first surface of the front substrate to an exterior wall or surface of the mirror casing.

Optionally, the reflective element may includes an opaque or substantially opaque or hiding perimeter layer or coating or band disposed around a perimeter edge region of the front substrate (such as at a perimeter region of the rear or second surface of the front substrate) to conceal or hide or the perimeter seal from viewing by the driver of the vehicle when the mirror assembly is normally mounted in the vehicle. Such a hiding layer or perimeter band may be reflective or not reflective and may utilize aspects of the perimeter bands and mirror assemblies described in U.S. Pat. Nos. 5,066,112; 7,626,749; 7,274,501; 7,184,190 and/or 7,255,451, and/or International Publication Nos. WO 2010/124064 and/or WO 2011/044312, and/or U.S. Pat. Pub. No. US-2006-0061008, which are all hereby incorporated herein by reference in their entireties. Optionally, the perimeter band may comprise a chrome/chromium coating or metallic coating and/or may comprise a chrome/chromium or metallic coating that has a reduced reflectance, such as by using an oxidized chrome coating or chromium oxide coating or "black chrome" coating or the like (such as by utilizing aspects of the mirror assemblies described in U.S. Pat. Nos. 7,184,190 and/or 7,255,451, which are hereby incorporated herein by reference in their entireties). Optionally, other opaque or substantially opaque coatings or bands may be implemented while remaining within the spirit and scope of the present invention.

Optionally, the interior rearview mirror assembly may include circuitry therein (such as at a printed circuit board or the like disposed within the mirror casing, and electrical connection to the circuitry may be made via an electrical lead or connector of a wiring harness of the vehicle. Optionally, the electrical connector may be received through the mirror casing and through an aperture established through the toggle element, such as by utilizing aspects of the mirror assemblies described in U.S. Pat. No. 5,798,688 and/or U.S. Publication No. US-2010-0085653, published Apr. 8, 2010, which are hereby incorporated herein by reference in their entireties.

The mirror assembly may include user actuatable inputs operable to control any of the accessories of or associated with the mirror assembly and/or an accessory module or the like. For example, the mirror assembly may include touch sensitive elements or touch sensors or proximity sensors, such as the types of touch sensitive elements described in U.S. Pat. Nos. 5,594,222; 6,001,486; 6,310,611; 6,320,282; 6,627,918; 7,224,324 and/or 7,253,723, and/or International Publication Nos. WO 2012/051500 and/or WO 2013/071070, which are hereby incorporated herein by reference in their entireties, or such as proximity sensors of the types described in U.S. Pat. Nos. 7,224,324; 7,249,860 and/or 7,446,924, and/or International Publication No. WO 2004/058540, which are hereby incorporated herein by reference in their entireties, or such as membrane type switches, such as described in U.S. Pat. No. 7,360,932, which is hereby incorporated herein by reference in its entirety, or such as detectors and the like, such as the types disclosed in U.S. Pat. Nos. 7,255,541; 6,504,531; 6,501,465; 6,492,980; 6,452,479; 6,437,258 and 6,369,804, which are hereby incorporated herein by reference in their entireties, and/or the like, while remaining within the spirit and scope of the present invention.

Changes and modifications in the specifically described embodiments may be carried out without departing from the principles of the present invention, which is intended to be limited only by the scope of the appended claims as interpreted according to the principles of patent law.

The invention claimed is:

1. An interior rearview mirror assembly for a vehicle, said interior rearview mirror assembly comprising:

a mounting structure configured for mounting at an interior portion of a vehicle equipped with said interior rearview mirror assembly;

a mirror casing adjustably disposed relative to said mounting structure;

an electro-optic reflective element disposed at said mirror casing and comprising a front substrate and a rear substrate and an electro-optic medium sandwiched therebetween and bounded by a perimeter seal;

wherein said front substrate has a first surface and a second surface and a first perimeter edge spanning between said first and second surfaces, said first surface being closer to a driver of the equipped vehicle when said mounting structure of said interior rearview mirror assembly is mounted at the interior portion of the equipped vehicle that is being driven by the driver;

wherein said second surface of said front substrate has a transparent conductive coating established thereat;

wherein said rear substrate has a third surface and a fourth surface and a second perimeter edge spanning between said third and fourth surfaces, said third surface being closer to said front substrate;

wherein said third surface of said rear substrate has a conductive coating established thereat;

wherein, with said electro-optic reflective element disposed at said mirror casing, said first and second perimeter edges of both said front and rear substrates are exterior the mirror casing and rounded so as to provide a curved transition between said first surface of said front substrate and an outer surface of said mirror casing;

a first electrical connector disposed at said fourth surface and in electrically conductive continuity with said transparent conductive coating at said second surface of said front substrate;

a second electrical connector disposed at said fourth surface and in electrically conductive continuity with said conductive coating at said third surface of said rear substrate;

wherein said first and second electrical connectors wrap around said rear substrate at a notched region of said rear substrate; and wherein said mirror casing includes a tab element that is received in the notched region of said rear substrate when said electro-optic reflective element is disposed at said mirror casing.

2. The interior rearview mirror assembly of claim 1, wherein said first and second perimeter edges are each curved with the same radius of curvature to provide a constant curved transition from said first surface of said front substrate and said outer surface of said mirror casing.

3. The interior rearview mirror assembly of claim 1, wherein said first and second perimeter edges are curved with different radii of curvature to provide the curved transition from said first surface of said front substrate and said outer surface of said mirror casing.

4. The interior rearview mirror assembly of claim 1, wherein said tab element comprises an outer surface, and wherein said first perimeter edge of said front substrate provides a curved transition between said first surface of said front substrate and said outer surface of said tab element at said notched region of said rear substrate.

5. The interior rearview mirror assembly of claim 4, wherein said tab element fills the notched region of said rear substrate and abuts against said second surface of said front substrate at the notched region when said electro-optic reflective element is disposed at said mirror casing.

6. The interior rearview mirror assembly of claim 1, wherein said first and second perimeter edges provide a curved transition from said first surface of said front substrate and said outer surface of said mirror casing having a radius of curvature of at least 2.5 mm, and wherein said front substrate comprises a front glass substrate and has a thickness between said first surface and said second surface, and wherein the thickness of said front glass substrate is less than 1.6 mm.

7. The interior rearview mirror assembly of claim 6, wherein said rear substrate comprises a rear glass substrate and has a thickness between said third surface and said fourth surface, and wherein the thickness of said rear glass substrate is less than 1.6 mm.

8. The interior rearview mirror assembly of claim 1, wherein said rear substrate attaches at an attachment element of said mirror casing.

9. The interior rearview mirror assembly of claim 8, wherein said fourth surface of said rear substrate is adhesively attached at at least a portion of said attachment element of said mirror casing.

10. The interior rearview mirror assembly of claim 9, wherein said attachment element comprises an attachment plate that is configured to snap attach at internal structure of said mirror casing to attach said electro-optic reflective element at said mirror casing.

11. An interior rearview mirror assembly for a vehicle, said interior rearview mirror assembly comprising:

a mounting structure configured for mounting at an interior portion of a vehicle equipped with said interior rearview mirror assembly;

a mirror casing adjustably disposed relative to said mounting structure;

an electro-optic reflective element disposed at said mirror casing and comprising a front glass substrate and a rear glass substrate and an electro-optic medium sandwiched therebetween and bounded by a perimeter seal;

wherein said front substrate has a first surface and a second surface and a first perimeter edge spanning between said first and second surfaces, said first surface being closer to a driver of the equipped vehicle when said mounting structure of said interior rearview mirror assembly is mounted at the interior portion of the equipped vehicle that is being driven by the driver;

wherein said second surface of said front substrate has a transparent conductive coating established thereat;

wherein said rear substrate has a third surface and a fourth surface and a second perimeter edge spanning between said third and fourth surfaces, said third surface being closer to said front substrate;

wherein said third surface of said rear substrate has a conductive coating established thereat;

wherein said rear substrate attaches at an attachment element of said mirror casing, and wherein said first and second perimeter edges are exposed and outside of said mirror casing when said rear substrate is attached at said attachment element of said mirror casing;

wherein said first and second perimeter edges comprise rounded perimeter surfaces;

wherein, with said electro-optic reflective element disposed at said mirror casing, said rounded perimeter surfaces of said first and second perimeter edges of said front and rear substrates cooperate to provide a curved transition between said first surface of said front substrate and an outer surface of said mirror casing;

a first electrical connector disposed at said fourth surface and in electrically conductive continuity with said transparent conductive coating at said second surface of said front substrate;

a second electrical connector disposed at said fourth surface and in electrically conductive continuity with said conductive coating at said third surface of said rear substrate;

wherein said first and second electrical connectors wrap around said rear substrate at a notched region of said rear substrate; and wherein said mirror casing includes a tab element that is received in the notched region of said rear substrate when said electro-optic reflective element assembly is disposed at said mirror casing.

12. The interior rearview mirror assembly of claim 11, wherein said first and second perimeter edges are each curved with the same radius of curvature to provide a constant curved transition from said first surface of said front substrate and said outer surface of said mirror casing.

13. The interior rearview mirror assembly of claim 11, wherein said first and second perimeter edges are curved with different radii of curvature to provide the curved transition from said first surface of said front substrate and said outer surface of said mirror casing.

14. The interior rearview mirror assembly of claim 11, wherein said tab element comprises an outer surface, and wherein said first perimeter edge of said front substrate provides a curved transition between said first surface of said front substrate and said outer surface of said tab element at said notched region of said rear substrate.

15. The interior rearview mirror assembly of claim 14, wherein said tab element fills the notched region of said rear substrate and abuts against said second surface of said front substrate at the notched region when said electro-optic reflective element is disposed at said mirror casing.

16. An interior rearview mirror assembly for a vehicle, said interior rearview mirror assembly comprising:

a mounting structure configured for mounting at an interior portion of a vehicle equipped with said interior rearview mirror assembly;

a mirror casing adjustably disposed relative to said mounting structure;

an electro-optic reflective element disposed at said mirror casing and comprising a front substrate and a rear substrate and an electro-optic medium sandwiched therebetween and bounded by a perimeter seal;

wherein said front substrate has a first surface and a second surface and a first perimeter edge spanning between said first and second surfaces, said first surface being closer to a driver of the equipped vehicle when said mounting structure of said interior rearview mirror assembly is mounted at the interior portion of the equipped vehicle that is being driven by the driver;

wherein said second surface of said front substrate has a transparent conductive coating established thereat;

wherein said rear substrate has a third surface and a fourth surface and a second perimeter edge spanning between said third and fourth surfaces, said third surface being closer to said front substrate;

wherein said third surface of said rear substrate has a conductive coating established thereat;

wherein said fourth surface of said rear substrate is adhesively attached at at least a portion of an attachment element of said mirror casing;

wherein said first and second perimeter edges are exposed and outside of said mirror casing when said fourth surface of said rear substrate is attached at said attachment element of said mirror casing;

wherein said first and second perimeter edges comprise rounded perimeter surfaces;

wherein, with said electro-optic reflective element disposed at said mirror casing, said rounded perimeter surfaces of said first and second perimeter edges of said front and rear substrates provide a curved transition between said first surface of said front substrate and an outer surface of said mirror casing;

a first electrical connector disposed at said fourth surface and in electrically conductive continuity with said transparent conductive coating at said second surface of said front substrate;

a second electrical connector disposed at said fourth surface and in electrically conductive continuity with said conductive coating at said third surface of said rear substrate;

wherein said first and second electrical connectors wrap around said rear substrate at a notched region of said rear substrate; and wherein said mirror casing includes a tab element that engages and fills the notched region of said rear substrate when said electro-optic reflective element is disposed at said mirror casing.

17. The interior rearview mirror assembly of claim 16, wherein said attachment element comprises an attachment plate that is configured to snap attach at internal structure of said mirror casing to attach said electro-optic reflective element at said mirror casing.

18. The interior rearview mirror assembly of claim 16, wherein said tab element comprises an outer surface, and wherein said first perimeter edge of said front substrate provides a curved transition between said first surface of said front substrate and said outer surface of said tab element at said notched region of said rear substrate.

19. The interior rearview mirror assembly of claim 16, wherein said tab element fills the notched region of said rear substrate and abuts against said second surface of said front substrate at the notched region when said electro-optic reflective element is disposed at said mirror casing.

\* \* \* \* \*

UNITED STATES PATENT AND TRADEMARK OFFICE
CERTIFICATE OF CORRECTION

PATENT NO. : 10,850,667 B2
APPLICATION NO. : 15/968807
DATED : December 1, 2020
INVENTOR(S) : Michael J. Baur Page 1 of 1

It is certified that error appears in the above-identified patent and that said Letters Patent is hereby corrected as shown below:

In the Specification

<u>Column 2</u>
Line 56, "(10)" should be --(IO)--

In the Claims

<u>Column 9</u>
Claim 11, Lines 15-16, "element assembly is disposed" should be --element is disposed--

Signed and Sealed this
Nineteenth Day of January, 2021

Andrei Iancu
*Director of the United States Patent and Trademark Office*